US011219173B2

(12) United States Patent
Campau et al.

(10) Patent No.: US 11,219,173 B2
(45) Date of Patent: Jan. 11, 2022

(54) DEEP WATER CULTURE HYDROPONIC SYSTEM

(71) Applicant: Flow-Rite Controls, Ltd., Byron Center, MI (US)

(72) Inventors: Daniel N. Campau, Ada, MI (US); Scott T. Kloote, Coopersville, MI (US)

(73) Assignee: Hydra Unlimited, LLC, Byron Center, MI (US)

(*) Notice: Subject to any disclaimer, the term of this patent is extended or adjusted under 35 U.S.C. 154(b) by 112 days.

(21) Appl. No.: 16/851,258

(22) Filed: Apr. 17, 2020

(65) Prior Publication Data
US 2021/0321584 A1 Oct. 21, 2021

(51) Int. Cl.
*A01G 31/02* (2006.01)
*A01G 27/00* (2006.01)
*A01G 31/00* (2018.01)

(52) U.S. Cl.
CPC ............ *A01G 31/02* (2013.01); *A01G 27/005* (2013.01); *A01G 27/008* (2013.01); *A01G 2031/006* (2013.01)

(58) Field of Classification Search
CPC .............. A01G 31/02; A01G 2031/006; A01G 27/005; A01G 27/008
See application file for complete search history.

(56) References Cited

U.S. PATENT DOCUMENTS

| 4,324,069 | A |   | 4/1982  | Flagg     |           |
|-----------|---|---|---------|-----------|-----------|
| 5,557,884 | A | * | 9/1996  | Deppe     | A01G 31/02 47/62 E |
| 9,144,206 | B1| * | 9/2015  | Rubanenko | A01G 31/02 |
| 10,562,673| B2|   | 2/2020  | Carmody   |           |
| 10,999,985| B2| * | 5/2021  | Watson    | A01G 29/00 |
| 2005/0081440 | A1 | * | 4/2005 | Sauvage | A01G 31/02 47/62 A |
| 2009/0126269 | A1 |   | 5/2009 | Wilson et al. | |
| 2012/0005957 | A1 |   | 1/2012 | Downs, Sr. | |
| 2015/0289463 | A1 |   | 10/2015 | Moriarty | |

(Continued)

FOREIGN PATENT DOCUMENTS

CN          101720660        12/2011

OTHER PUBLICATIONS

International Search Report and Written Opinion from PCT/US2021/015671 dated Jun. 9, 2021.

(Continued)

*Primary Examiner* — Son T Nguyen
(74) *Attorney, Agent, or Firm* — Warner Norcross + Judd LLP (57) ABSTRACT

The specification discloses a DWC hydroponic system that includes a plurality of grow tanks, a circulation pump, a nutrient supply line fluidly connecting the outlet of the circulation pump to the grow tanks, and a tank drain line fluidly connected to the grow tanks. Each of the grow tanks is fluidly connected in parallel between the nutrient supply line and the tank drain line. The system further includes a pump suction line fluidly connected to the inlet of the circulation pump, and a plurality of bridge connectors each fluidly connecting the tank drain line to the pump suction line in accordance with a defined pattern. The DWC system may further include a nutrient supply fluidly connected to the circulation pump intake through a valve arrangement.

19 Claims, 13 Drawing Sheets

(56) References Cited

U.S. PATENT DOCUMENTS

| 2016/0044879 | A1* | 2/2016 | Hamlin | A01G 31/02 |
| | | | | 47/62 R |
| 2016/0057950 | A1* | 3/2016 | Narasipur | A01G 31/02 |
| | | | | 47/62 A |
| 2019/0223395 | A1* | 7/2019 | Warrick | A01G 9/027 |

OTHER PUBLICATIONS

International Search Report and Written Opinion from PCT/US2021/015671 dated Sep. 9, 2021.
Communication in cases for which no other form is applicable from PCT/US2021/015671 dated Sep. 9, 2021.
"2019 Cultivation Solutions Product Catalog" (Current Culture H2O—Copyright 2018).
"Under Current The Proven Production System 2019 Assembly Instructions" (Current Culture H2O—Copyright 2018).
"Drain to Waste" (Cultured Solutions H2O) (Admitted Prior Art).
"Re-Circulating Hydro" (Cultured Solutions H2O) (Admitted Prior Art).
U.S. Appl. No. 16/057,116, filed Aug. 7, 2018, Hydroponic Nutrient Aeration and Flow Control Device and System.
U.S. Appl. No. 16/719,420, filed Dec. 18, 2019, Hydroponic Nutrient Solution Aeration Device.

* cited by examiner

HM-4X3-B.SLDASM [HM-4X3-B [Default]]   ALL BRIDGES  ID = .936

| Goal Name | Unit | Value | Averaged Value | Minimum Value | Maximum Value | Progress [%] | Use In Convergence | Delta | Criteria | LEVEL |
|---|---|---|---|---|---|---|---|---|---|---|
| SG Av Static Pressure 1 | [lbf/in^2] | 14.86449977 | 14.8733031 | 14.85872721 | 14.88405674 | 54 | Yes | 0.00444988 | 0.002404881 | 4.925086 |
| SG Av Static Pressure 2 | [lbf/in^2] | 14.86540406 | 14.87425058 | 14.85999617 | 14.88508431 | 53.6 | Yes | 0.00448159 | 0.002404716 | 4.951405 |
| SG Av Static Pressure 3 | [lbf/in^2] | 14.86606761 | 14.87495179 | 14.86069499 | 14.88577934 | 52.7 | Yes | 0.004457311 | 0.002404338 | 4.970883 |
| SG Av Static Pressure 4 | [lbf/in^2] | 14.86431768 | 14.87312117 | 14.86047649 | 14.88527656 | 48.8 | Yes | 0.005053791 | 0.00247119 | 4.920032 |
| SG Av Static Pressure 5 | [lbf/in^2] | 14.86516715 | 14.87406311 | 14.86141067 | 14.88610203 | 46.9 | Yes | 0.005252969 | 0.002466881 | 4.946197 |
| SG Av Static Pressure 6 | [lbf/in^2] | 14.86589435 | 14.87481425 | 14.86217137 | 14.88693675 | 46.2 | Yes | 0.005332007 | 0.002465417 | 4.967062 |
| SG Av Static Pressure 7 | [lbf/in^2] | 14.86526219 | 14.87437413 | 14.86267408 | 14.88666939 | 94.2 | Yes | 0.002844803 | 0.002679846 | 4.954837 |
| SG Av Static Pressure 8 | [lbf/in^2] | 14.86638524 | 14.87534268 | 14.863595 | 14.88751957 | 86.3 | Yes | 0.003098931 | 0.002674393 | 4.981741 |
| SG Av Static Pressure 9 | [lbf/in^2] | 14.86688695 | 14.8759201 | 14.86415384 | 14.88807922 | 86 | Yes | 0.003107469 | 0.002673104 | 4.997781 |
| SG Av Static Pressure 10 | [lbf/in^2] | 14.88609733 | 14.87257523 | 14.86014798 | 14.88609733 | 96.6 | Yes | 0.002279458 | 0.002701246 | 4.904867 |
| SG Av Static Pressure 11 | [lbf/in^2] | 14.88729536 | 14.87362396 | 14.86109299 | 14.88729536 | 90.3 | Yes | 0.002990461 | 0.002701838 | 4.933999 |
| SG Av Static Pressure 12 | [lbf/in^2] | 14.88792046 | 14.87428525 | 14.86169278 | 14.88792046 | 88.3 | Yes | 0.003056526 | 0.002699395 | 4.952368 |

Iterations [ ]: 296
Analysis interval: 124

DEEP WATER CULTURE HYDROPONIC SYSTEM

BACKGROUND

The present invention is directed to deep water culture hydroponic systems, and more particularly to nutrient solution circulation equipment and methods for such systems.

Deep water culture (DWC) hydroponic systems are widely used. Such systems generally include individual growing buckets interconnected by a common pipeline for (a) circulating nutrient solution to the buckets and (b) maintaining a common liquid level in the buckets. Various designs are used, depending on the number of buckets in the system.

The most commonly used designs are bottom systems, such as those manufactured by Current Culture H2O, especially under the UNDER CURRENT® trademark. These systems feature an "epicenter" or reservoir tank, which serves as the nutrient mixing tank and usually includes a float valve to maintain a pre-set liquid level. The epicenter tank feeds nutrient solution to one or more rows of growing buckets connected to the epicenter tank by the common pipeline, which is near the bottom of the tanks. At the end of each row, a pump is provided to draw nutrient solution from the pipeline and return it to the epicenter tank. This design creates a circulation in which nutrient flows from the epicenter tank, progresses from one tank to the next in a sequential or serial order, and then returns to the epicenter tank. This design often includes a system air pump and bubblers in each grow tank to oxygenate the nutrient solution.

Unfortunately, existing bottom systems have a number of shortcomings in their design and performance.

First, existing bottom systems generally require a large diameter (2.5" or more) pipeline to enable nutrient solution circulation and to maintain a common nutrient solution level in the tanks by gravity. Accordingly, labor and material costs are relatively high. Installation and assembly require skill and precision to assure proper leak-free operation. Tanks become rigidly constrained to each other.

Second, existing bottom systems use progressive or sequential circulation, which leads to variation in nutrient solution quality delivered to each bucket. Circulation rate is limited in order to assure gravity equalized tank levels. As a result, plants are not consistently maintained in equal nutrient environments. This manifests itself in roots seeking nutrient and growing into the circulation piping between tanks, potentially partially blocking circulation of nutrient.

Third, in existing bottom systems, nutrient concentrations and pH level must be adjusted as plants grow. These adjustments are slow to make in bottom systems. Chemicals must be added slowly to the epicenter tank to avoid shocking the plants, particularly the plants in the first buckets downstream of the epicenter. This process reduces the time that system operators have for other tasks.

SUMMARY

The aforementioned problems are overcome by the present invention.

In a first embodiment of the invention, the DWC nutrient circulation system supplies the grow tanks in parallel and empties the grow tanks at essentially the same rate as the tanks are filled. Therefore, each grow tank receives the same volume and the same quality of nutrient solution, and the level of the solution across grow tanks is equal.

The hydroponic system of the first embodiment includes a plurality of grow tanks arranged in pairs, a circulation pump having an inlet and an outlet, a nutrient supply line fluidly connecting the outlet of the circulation pump to the grow tanks, and a tank drain line fluidly connected to the grow tanks. Each of the grow tanks is fluidly connected in parallel between the nutrient supply line and the tank drain line. The system further includes (a) a pump suction line fluidly connected to the inlet of the circulation pump and (b) a plurality of bridge connectors each fluidly connecting the tank drain line to the pump suction line.

This first embodiment of the DWC plumbing system provides a number of advantages over known systems. The DWC system maintains equalized tank solution levels across the grow tanks, and the system delivers fresh nutrient to the grow tanks essentially simultaneously in essentially equal volumes. The DWC system enables the use of relatively small diameter pipe, fewer and simpler tank connections, and a consistent method for scaling system size from two to virtually any number of tanks operating together. The DWC system eliminates the need for the series connection of grow tanks. The DWC system enables flexible grow tank configurations and connections, which simplify setup, operation, and maintenance, all using relatively low-skilled labor. The DWC system enables grow tanks to be individually moved or removed for cleaning.

In a second embodiment of the invention, the DWC system includes a nutrient supply tank fluidly connected to the circulating pump intake through a valve arrangement. This enables fresh nutrients and/or pH change chemicals to be added to the system through the nutrient supply tank. The contents of the nutrient supply tank are drawn into the pump suction line and are mixed with the recirculating solution from the grow tanks. The mixture or blend is pumped through the piping, and is injected into the grow tanks in a relatively short time, essentially simultaneously and in essentially equal amounts to each grow tank.

This second embodiment of the DWC plumbing system provides a number of advantages over known systems. For example, the DWC system enables the relatively simple, safe, and rapid adjustment of nutrient and pH levels of the nutrient solution, thereby reducing the risk of shocking the plants.

These and other advantages and features of the invention will be more fully understood and appreciated by reference to the description of the current embodiment and the drawings.

DESCRIPTION OF THE CURRENT EMBODIMENTS

I. Introduction

Before the embodiments of the invention are described, it is to be understood that the invention is not limited to (a) the details of operation or construction or (b) the arrangement of the components set forth in the following description or illustrated in the drawings. The invention may be implemented in various other embodiments and may be practiced or carried out in alternative ways not expressly disclosed herein.

In addition, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include (a) any one or more of X, Y or Z individually or (b) any combination of any one or more of X, Y and Z, for example, X, Y, Z; X, Y; X, Z; and Y, Z.

Directional terms, such as "vertical," "horizontal," "top," "bottom," "upper," "lower," "inner," "inwardly," "outer," and "outwardly," are used to assist in describing the invention based on the orientation of the embodiments shown in the illustrations. The use of directional terms should not be interpreted to limit the invention to any specific orientation.

II. The Deep Water Culture (DWC) System

A deep water culture (DWC) hydroponic system constructed in accordance with a first embodiment of the invention is illustrated in the drawings and generally designated 10. The system 10 includes a plurality of buckets or grow tanks 12 and a nutrient supply system 14.

Figure 1:
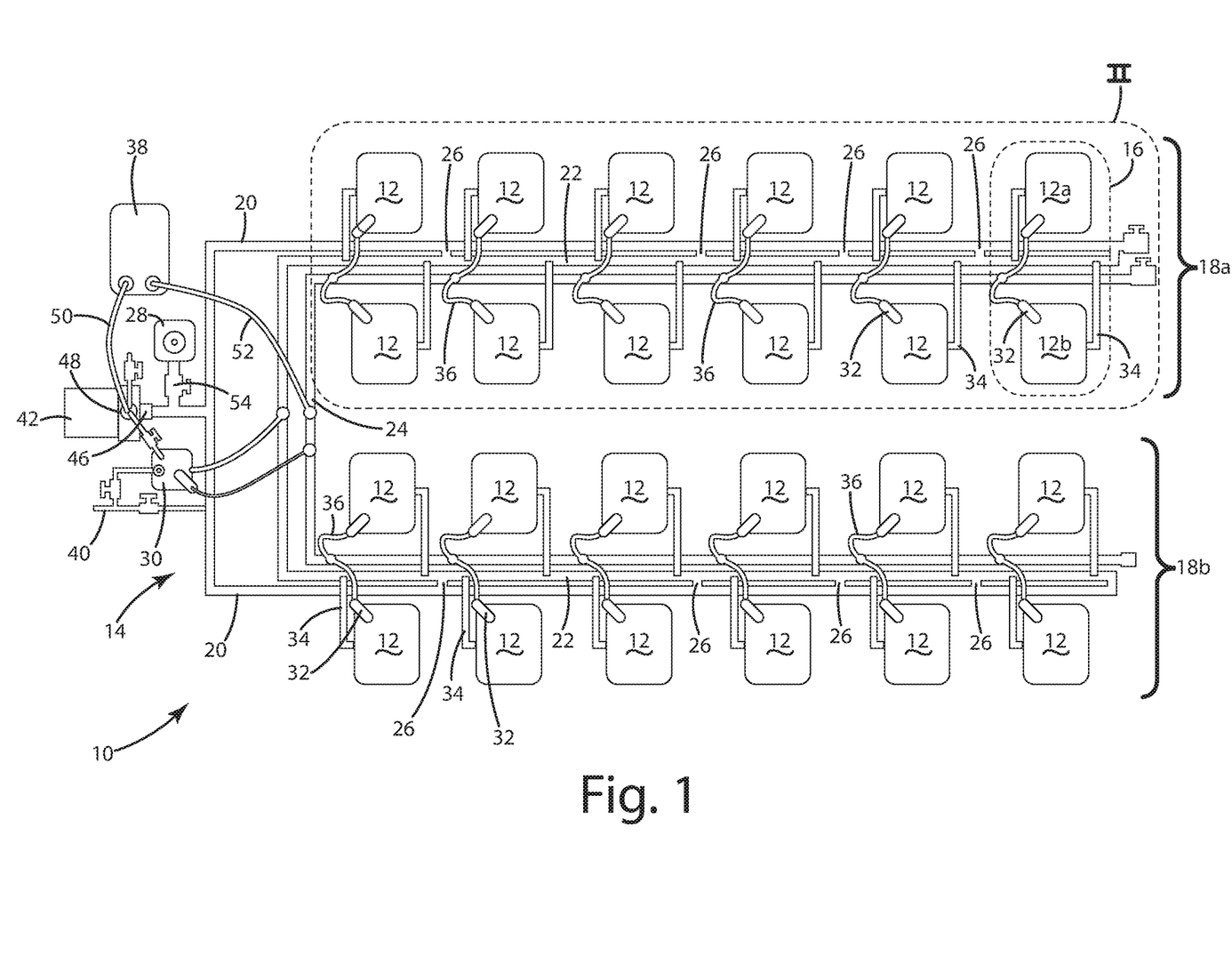
FIG. 1 is a top plan view of a first embodiment of the DWC system.

The disclosed embodiment includes twenty-four buckets or grow tanks 12. However, virtually any number of buckets could be included. The buckets 12 are arranged in pairs such as the bucket pair 16, which includes bucket 12a and bucket 12b. As seen in FIG. 1, the buckets 12 are arranged into two banks 18a and 18b of twelve buckets (and therefore six pairs) each.

The nutrient supply system 14 includes a pump suction line 20, a tank drain line 22, a nutrient feed line 24, a plurality of bridge connectors 26, a nutrient tank 28, a level control tank 30, a plurality of circulators 32, a plurality of tank drain hoses or tank drain connection lines 34, a plurality of circulator supply hoses 36, a chiller 38, a fresh water feed line 40, a circulation pump 42, and various valves 44.

The pump suction line 20, the tank drain line 22, and the nutrient feed line 24 preferably are parallel to one another within each bank 18 of grow tanks 12. The pump suction line 20 is fluidly connected to the inlet or suction 46 of the circulation pump 42. The tank drain line 22 is fluidly connected to the level control tank 30. The nutrient feed line 24 is fluidly connected to the output of the chiller 38.

Figure 3:
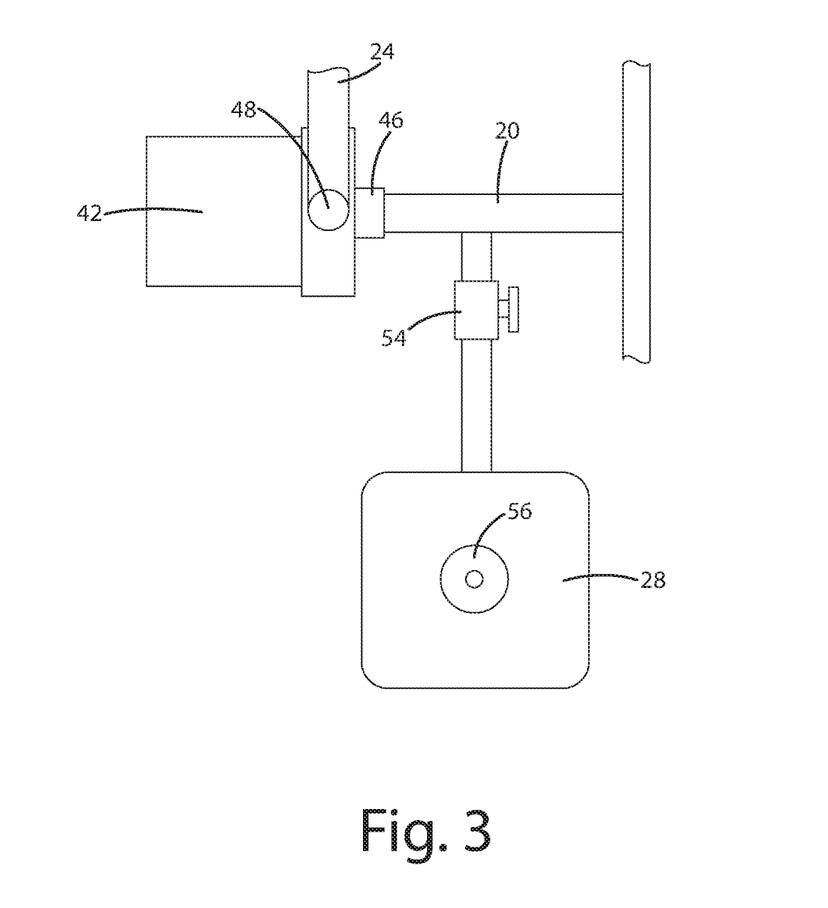
FIG. 3 is a top plan view of the pump and the nutrient supply tank.

The output 48 of the circulation pump 42 is fluidly connected to the chiller 38 by line 50. The output of the chiller 38 is fluidly connected to the nutrient supply line 24 by the hose 52. The inclusion of the chiller 38 is optional. If the chiller 38 is not included, the nutrient supply line 24 is connected directly to the output 48 of the circulation pump 42. Typically, the lines of one or two banks 18 would be served by one circulation pump 42.

Each of the grow tanks 12 is fluidly connected by a drain hose 10 to the drain line 22. Each grow tank 12 includes a circulator 32 mounted on and/or in the tank. Each circulator 32 is fluidly connected by a circulator supply hose 36 connected to the nutrient feed line 24. Fresh nutrient is introduced into each tank 12 through the circulator 32, while stale nutrient leaves each tank through the drain hose 10. The circulators 32 may be of any suitable type known to those skilled in the art. Example circulators are disclosed in (a) U.S. application Ser. No. 16/057,116 filed Aug. 7, 2018 entitled "Hydroponic Nutrient Aeration and Flow Control Device and System" and (b) U.S. application Ser. No. 16/719,420 filed Dec. 18, 2019 entitled "Hydroponic Nutrient Solution Aeration Device." The disclosures of both applications are incorporated by reference.

The bridge connectors 26 fluidly connect the drain line 22 to the pump suction line 20 at selected locations. The circulator pump 42 draws the stale nutrient into the suction line 20 from the drain line 22 through the bridge connectors 26. The number and the location of the bridge connectors 26 preferably follows a pattern that depends on the number of tank pairs 16 located along the banks 18.

Figure 2:
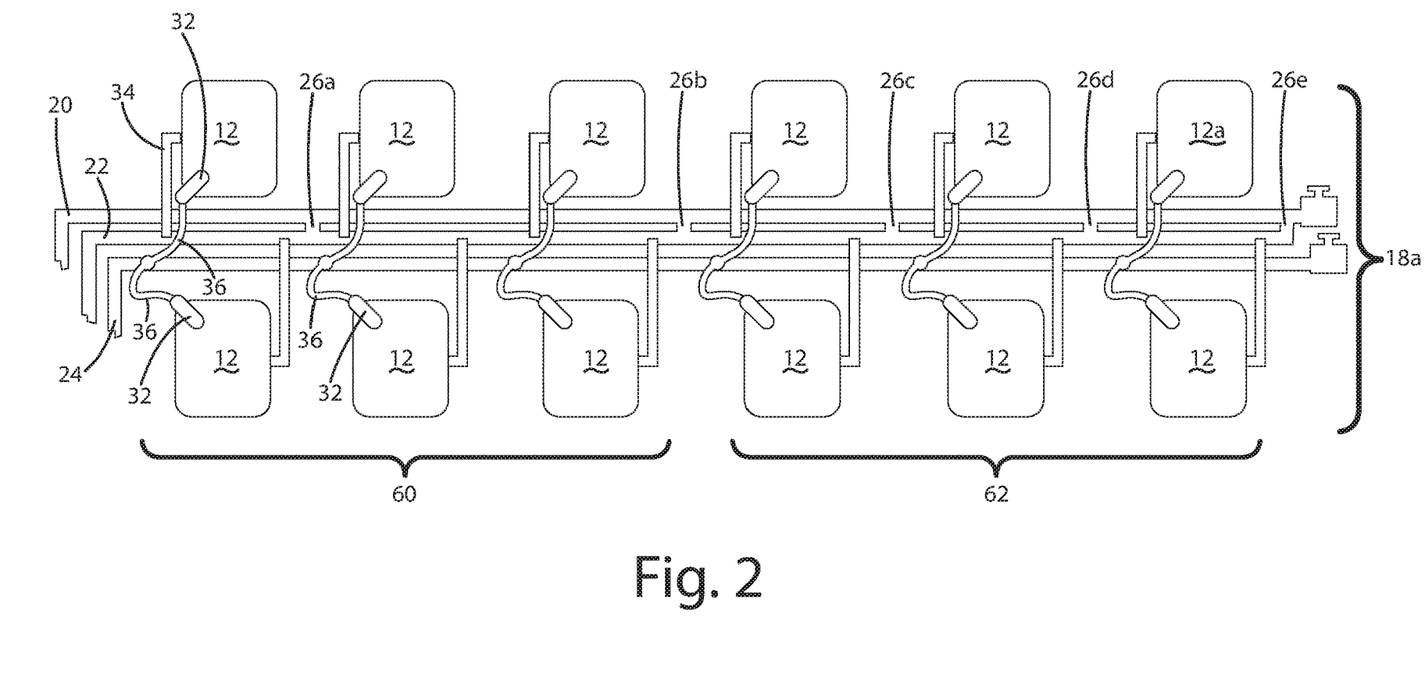
FIG. 2 is an enlarged top plan view of the area within line II in FIG. 1.

FIG. 2 shows the bank 18a of tanks 12. As previously noted, the tanks 12 are arranged in pairs 16, such as the pair including tanks 12a and 12b. In the current embodiment, each bank 18 includes six pairs 16 of tanks 12 for a total of twelve tanks in the bank. A first half 60 of the pairs (i.e. three pairs) in the bank 18a is relatively close to the circulation pump 42, and a second half 62 of the pairs (i.e. three pairs) is relatively remote from the circulation pump. When a bank 18 includes an even number of pairs 16 (as illustrated), each half 60, 62 includes an equal number of tanks 12. When a bank includes an odd number of pairs 16, one of the halves 60, 62 includes one more pair than the other half.

The number and the pattern of the bridge connectors 26 is a function of the number of tank pairs 16 within the bank 18. This number of tank pairs is designated N. In the disclosed system, N is 6 for each of the banks 18a, 18b.

For the first half 60 of the tank pairs, the number of bridge connectors within the half is:

One bridge if $N \geq 4$

No bridge if $N \leq 3$

Because N is 6 in the disclosed embodiment, and because 6 is greater than or equal to 4, one bridge connector is included in the area of the first half 60. This one bridge connector is designated 26a in FIG. 2. The bridge connector 26a may be located anywhere within the first half 60, but preferably is somewhat centrally located.

For the second half 62 of the tank pairs, the number of bridge connectors within the half is:

$(N/2)+1$ if N is even $(N/2)+0.5$ if N is odd

The above formulas result in an even number N and the next higher odd number N+1 having the same number of bridge connectors.

Because N is 6 in the disclosed embodiment, four (i.e. 6/2+1) bridge connectors are included in the second half 60. These bridge connectors are designated 26b, 26c, 26d, and 26e. Preferably the bridge connectors are located at somewhat regular intervals within the second half 62.

With the number and the location of the bridge connectors 26 according to the pattern, the bridge connectors assist in providing an essentially uniform suction line vacuum pressure in the drain line 22. Consequently, each grow tank 12 empties at essentially the same rate as the tank is filled by the circulator 32. This issue is discussed below in more detail in the section entitled "Computational Fluid Dynamic Verification of DWC System" and illustrated in FIGS. 7-13.

Currently, the drain hoses 34 and the circulator supply lines 36 are flexible hoses to allow some tank movability. Further, the hoses may be fitted with quick disconnects so the individual grow tanks 12 can be removed, for example, for cleaning.

Currently, the lines 20, 22, and 24 may be 1 inch ID polyethylene pipe with push-together fittings for ease of assembly and handling, eliminating the need to use large tank bulkhead fittings and PVC pipe. Other materials may be used for the lines 20, 22, and 24, including flexible hose. For longer lines, larger diameter may be used to reduce pump pressure drop.

As described, the system 10, including the nutrient circulation system 14, maintains an essentially equal liquid level in each grow tank as fresh oxygenated nutrient is introduced equally and simultaneously into each tank.

III. The DWC Nutrient Mixing and Feed System

The nutrient supply tank 28 and its connection within the system 10 reduce the time required for nutrient and pH adjustment from as much as one hour down to several minutes. The nutrient supply tank 28 and its connection within the system 10 also virtually eliminate the possibility of shocking the plants with high concentrations of chemicals.

The following steps are followed when the nutrient level and/or the pH are to be adjusted.

The DWC system 10 is filled with fresh water and/or is otherwise prepared for nutrient and/or pH adjustment.

The circulation pump 42 is turned off, and the shut-off valve 54 is opened, enabling the water level in the nutrient tank 28 to rise to the same level as the water level in the grow tanks 12.

The nutrient chemicals in the amount required for all the grow tanks together are introduced into the nutrient tank 28 and preferably are stirred until mixed.

The circulation pump 42 is then turned back on. The nutrient tank contents are drawn into the pump suction line 20 and are mixed with the return solution from the grow tanks 12, diluting the nutrient tank contents to a safe level. Generally speaking, it takes approximately two minutes to empty the nutrient tank 28. A foot valve 56 in the bottom of the nutrient tank 28 closes as the tank empties, preventing air from entering the pump suction line 20.

The circulation pump 42 delivers the solution to the nutrient feed line 24, from which the solution is fed into each grow tank 12 essentially equally and essentially simultaneously.

IV. Computational Fluid Dynamic Verification of the DWC System

Computer-aided design (CAD) models of various configurations of the DWC system 10 incorporating the bridge system design methodology of the present invention have been modeled using SOLIDWORKS® Flow Simulation program. The models indicate, among other factors, the uniformity of the solution levels within the individual tanks 12 of the system. The results of the computational fluid dynamics (CFD) models of configurations of systems having 4, 6, 7, 8, 9, 12, and 24 tanks are illustrated in FIGS. 7-13 respectively.

The CFD models were compared with actual laboratory results. In all cases, the CFD models matched the laboratory results, and the models met the design goal of less than 0.5 inch variation among the solution levels within the individual tanks. The CFD models accurately predict system performance. And the CFD models may be used to determine the appropriate inside diameters of the bridge connectors 26 for optimum solution level equalization.

V. Syringe Injection of Liquids

Figure 4:
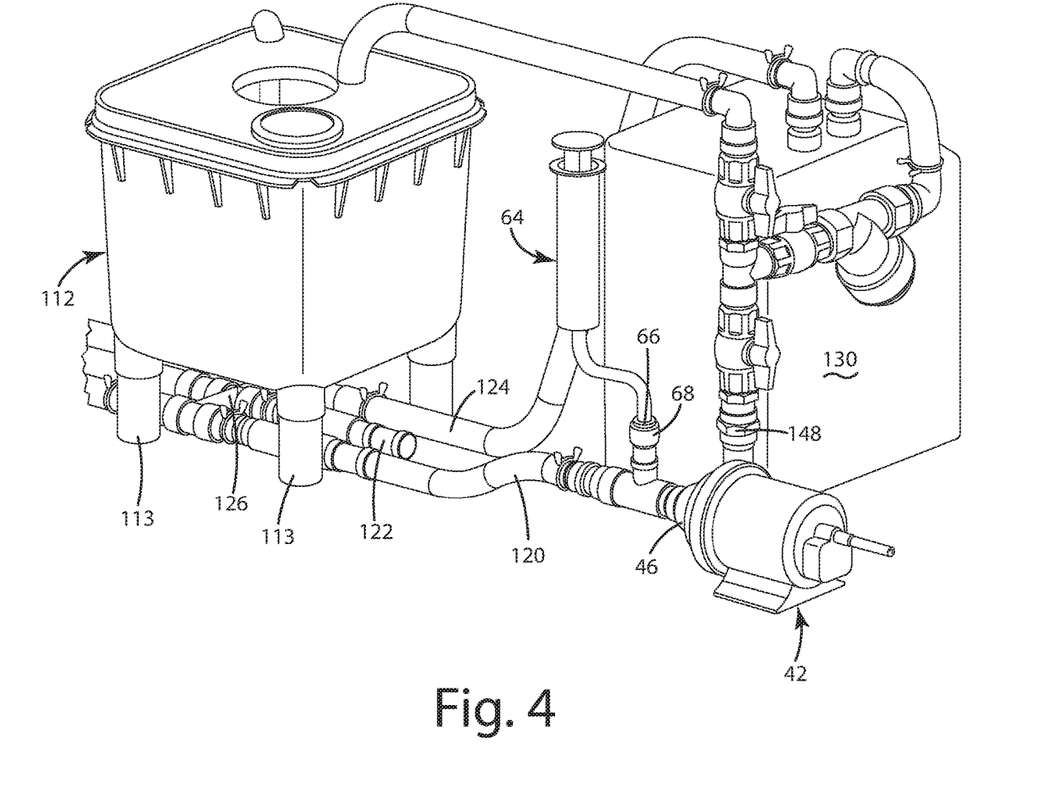
FIG. 4 is a perspective view of a portion of a second embodiment of the DWC system.

A variation of using the nutrient tank 28 to add liquid nutrients to the system is illustrated in FIG. 4. This variation includes a syringe 64 that may be releasably fluidly connected to the pump suction line 20, which in turn is connected to the intake 46 of the pump 42. The syringe 64 in essence replaces the nutrient supply tank 28. The syringe 64 is fitted with a quick coupling 66 that may be snapped into a mating coupler 68 mounted to the pump suction line 20 proximate the pump inlet 46.

To add liquid nutrient, the syringe 64 is removed (if not already removed) by disconnecting the quick coupling 66 from the coupler 68. The syringe 64 is then filled by positioning the quick coupling in a supply of liquid nutrient (not shown) and drawing the nutrient into the syringe. The quick coupling 66 is then reconnected to the coupling 68, and the liquid nutrient within the syringe 64 may be pushed into the pump suction line 20 to mix with the returning nutrient. This variation is both fast and convenient.

VI. Under-Tank Plumbing and Plug-In Tanks

Figure 5:
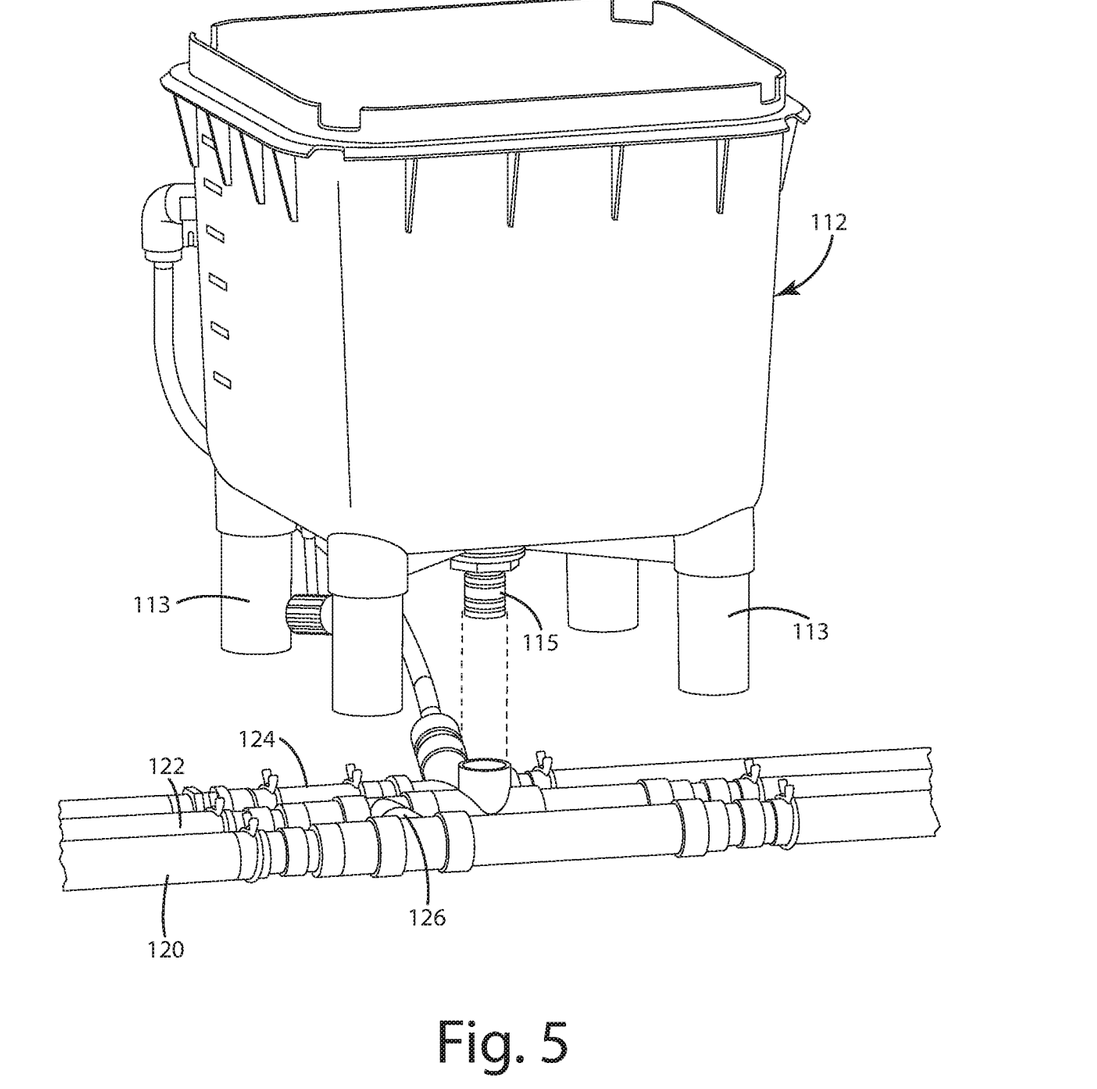
FIG. 5 is a perspective view of a tank elevated above the plumbing in the second embodiment.
Figure 6:
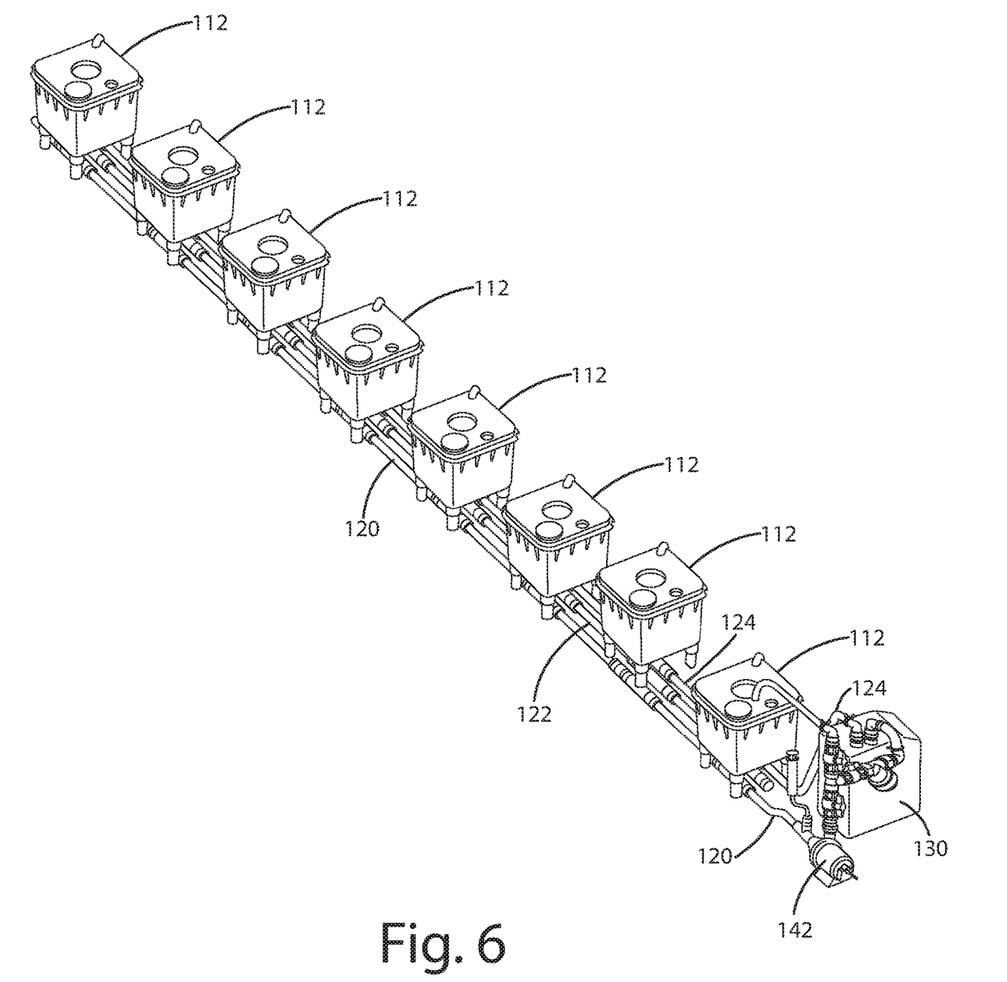
FIG. 6 is a perspective view of the second embodiment.
Figure 7:
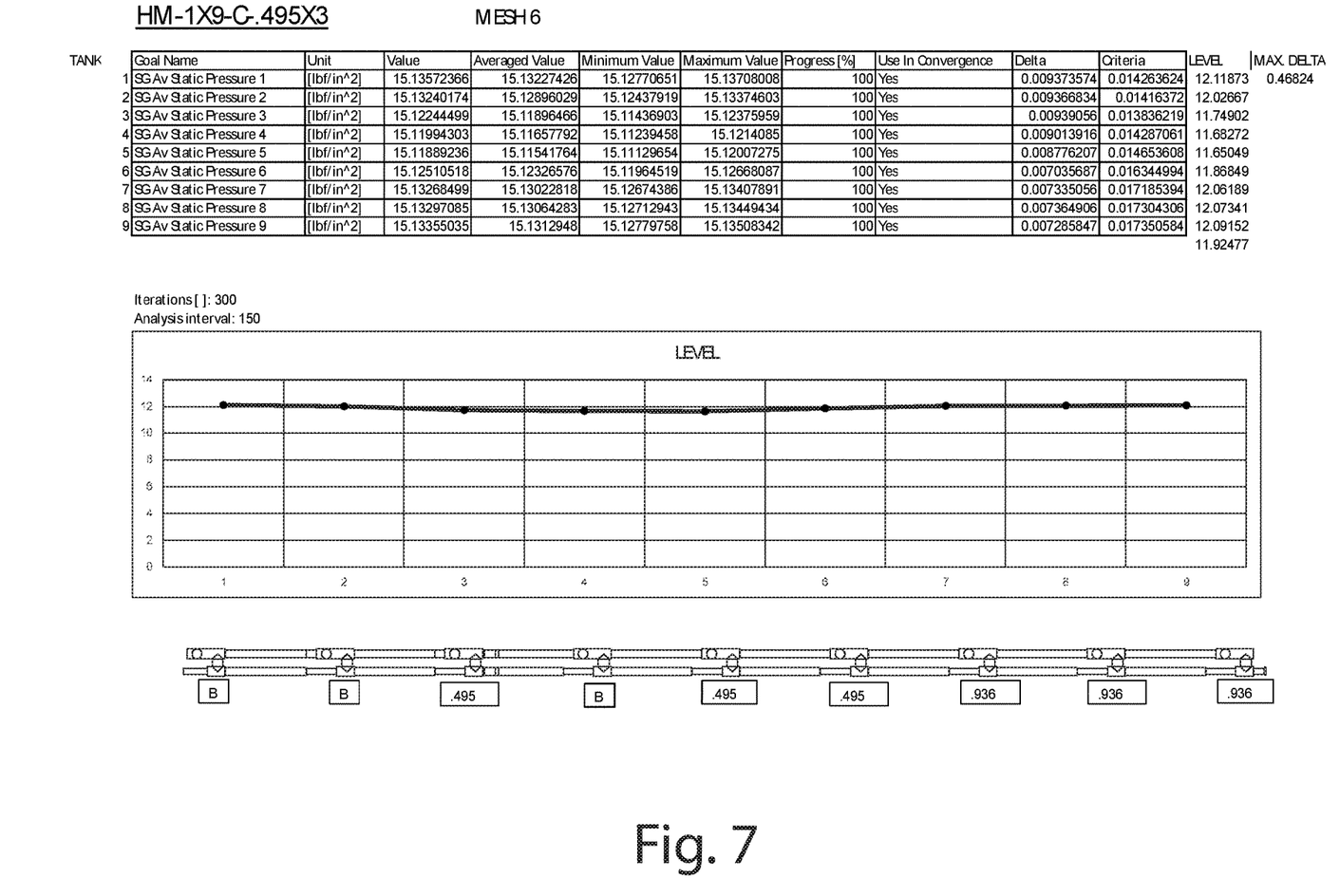
FIGS. 7-13 are the computational fluid dynamics (CFD) model results of various configurations of the DWC system.
Figure 8:
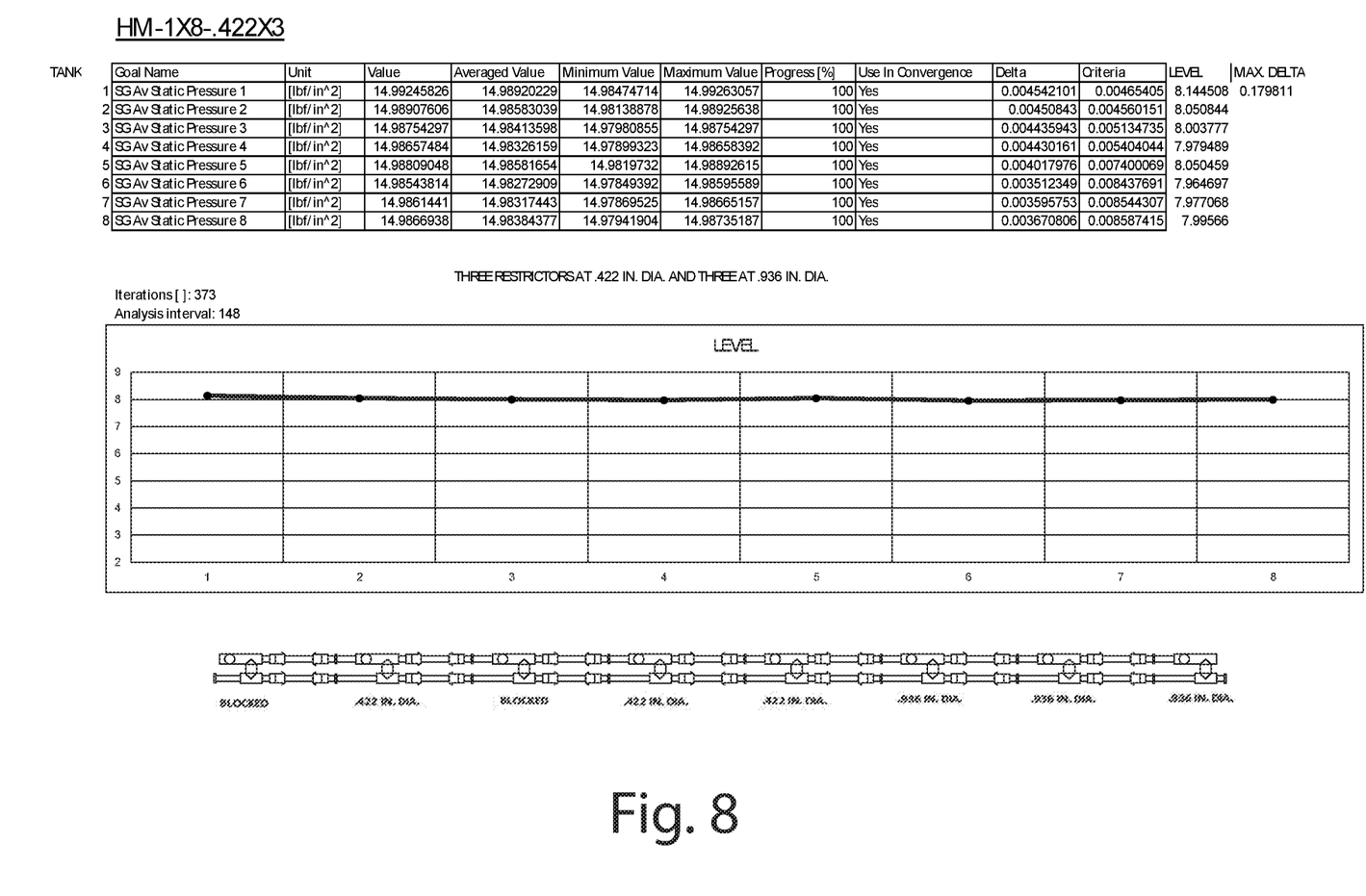
Figure 9:
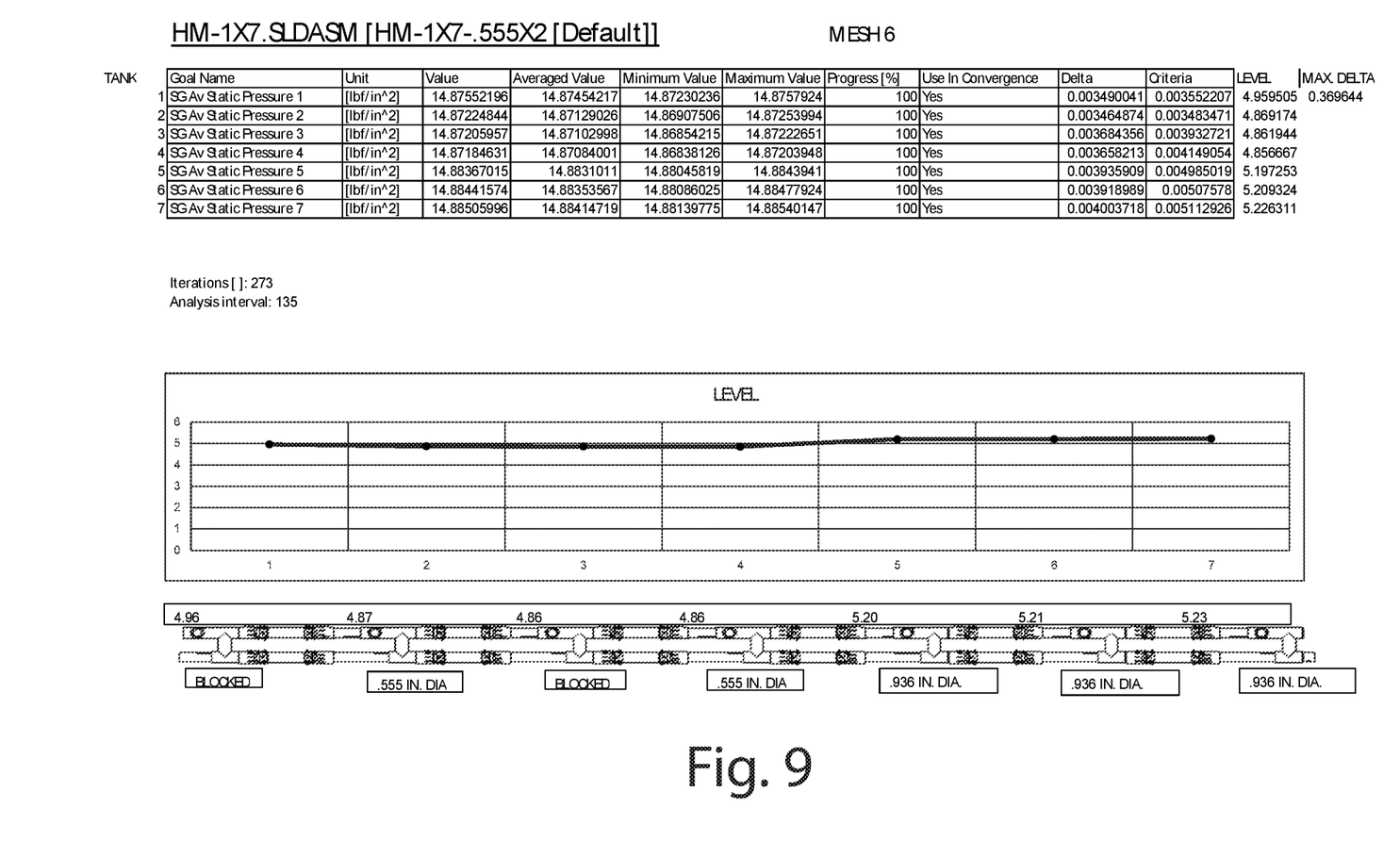
Figure 10:
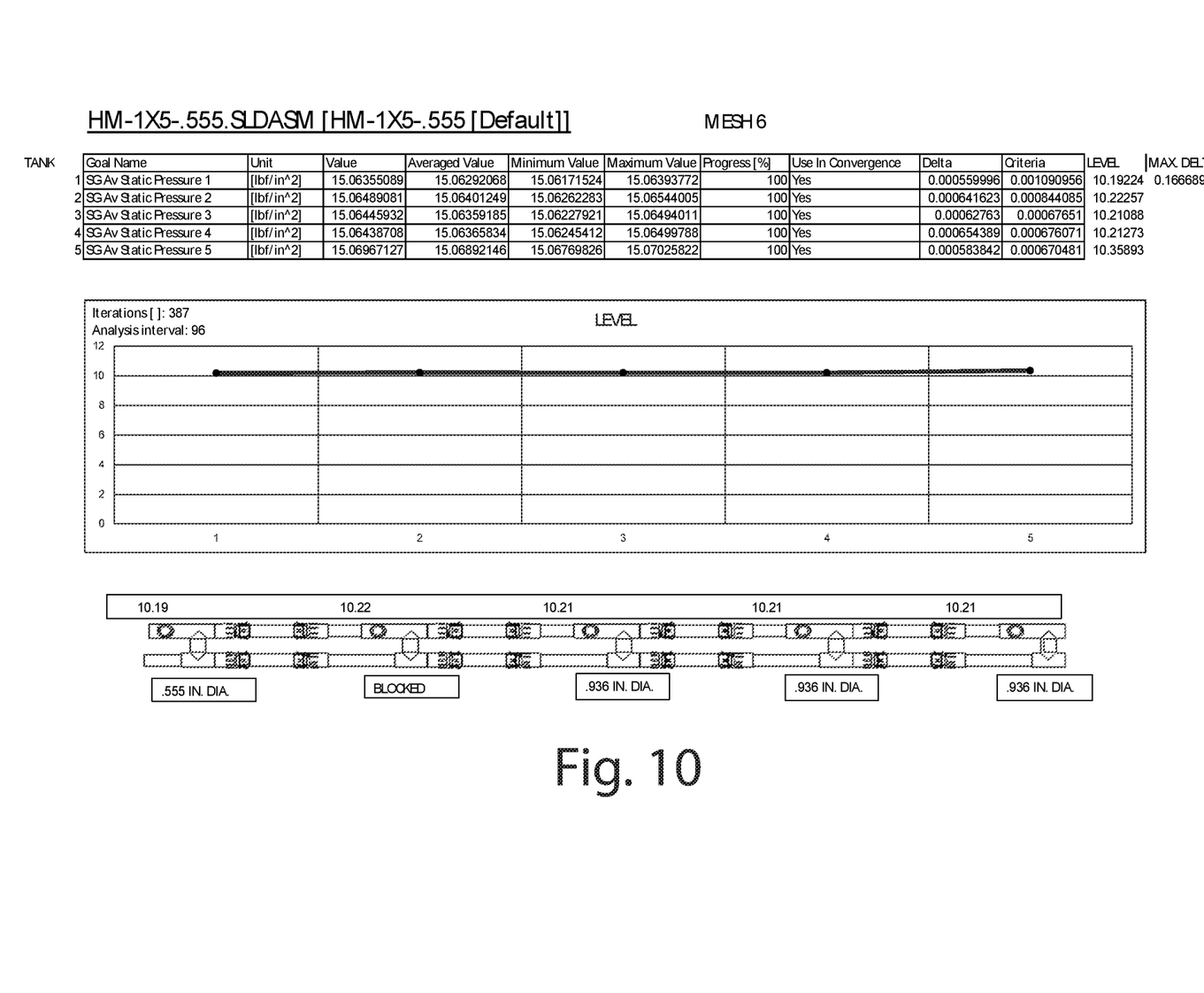
Figure 11:
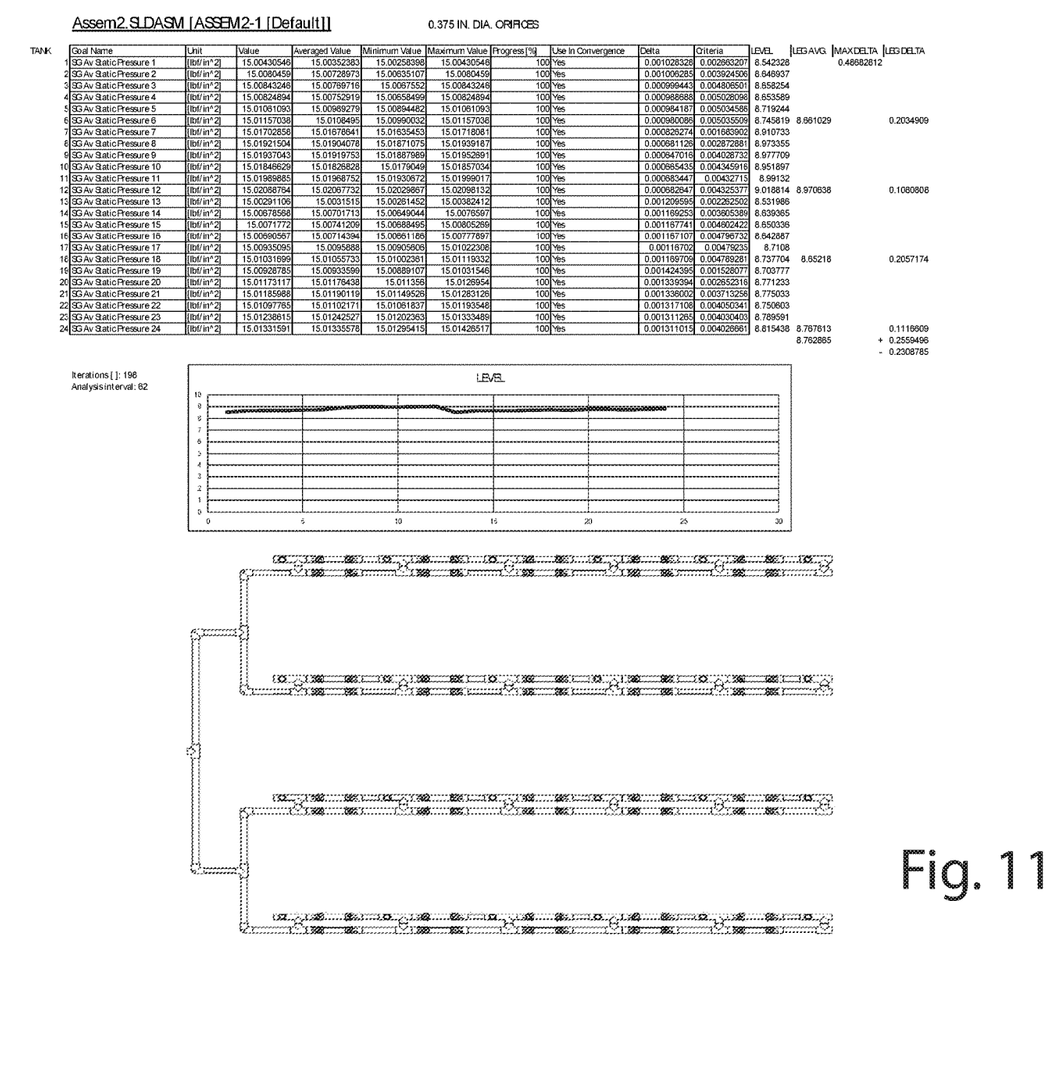
Figure 12:
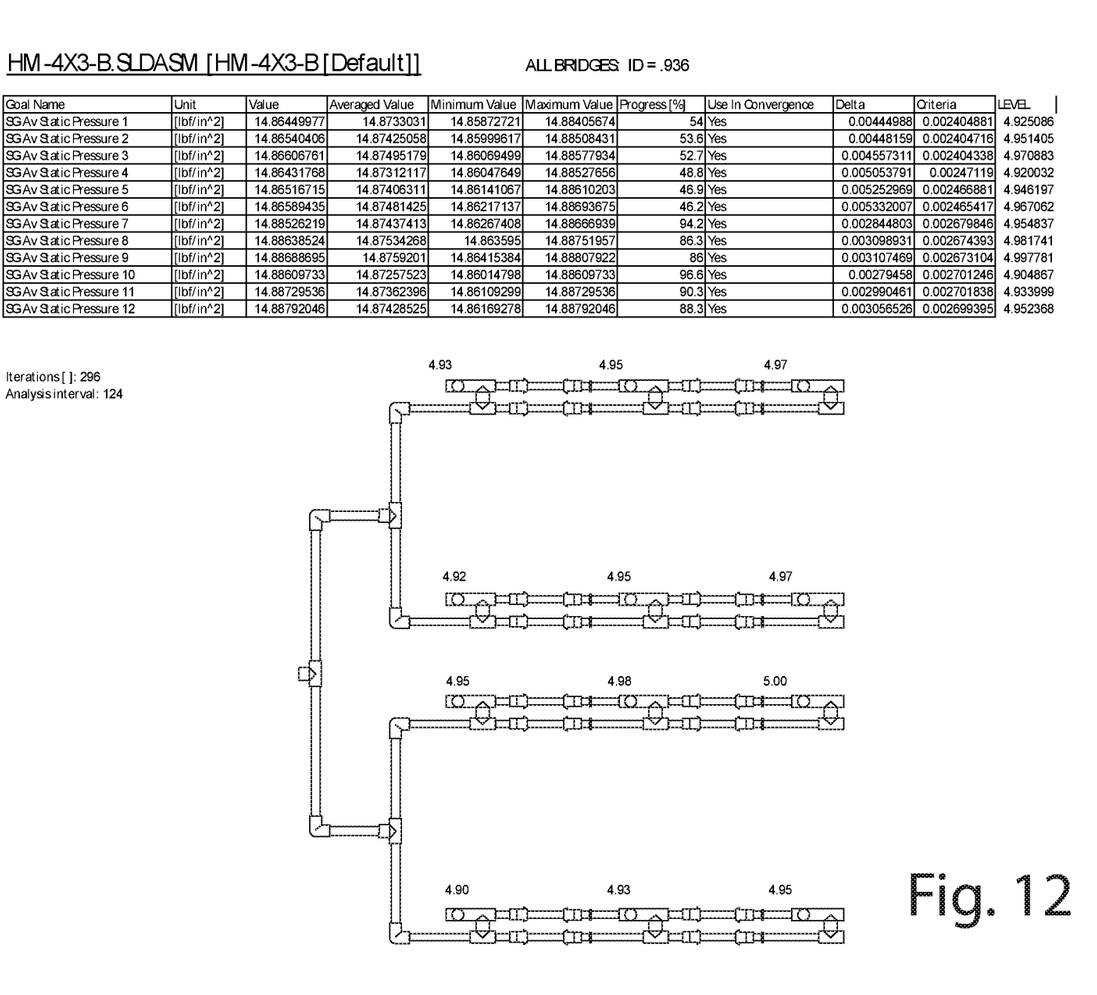
Figure 13:
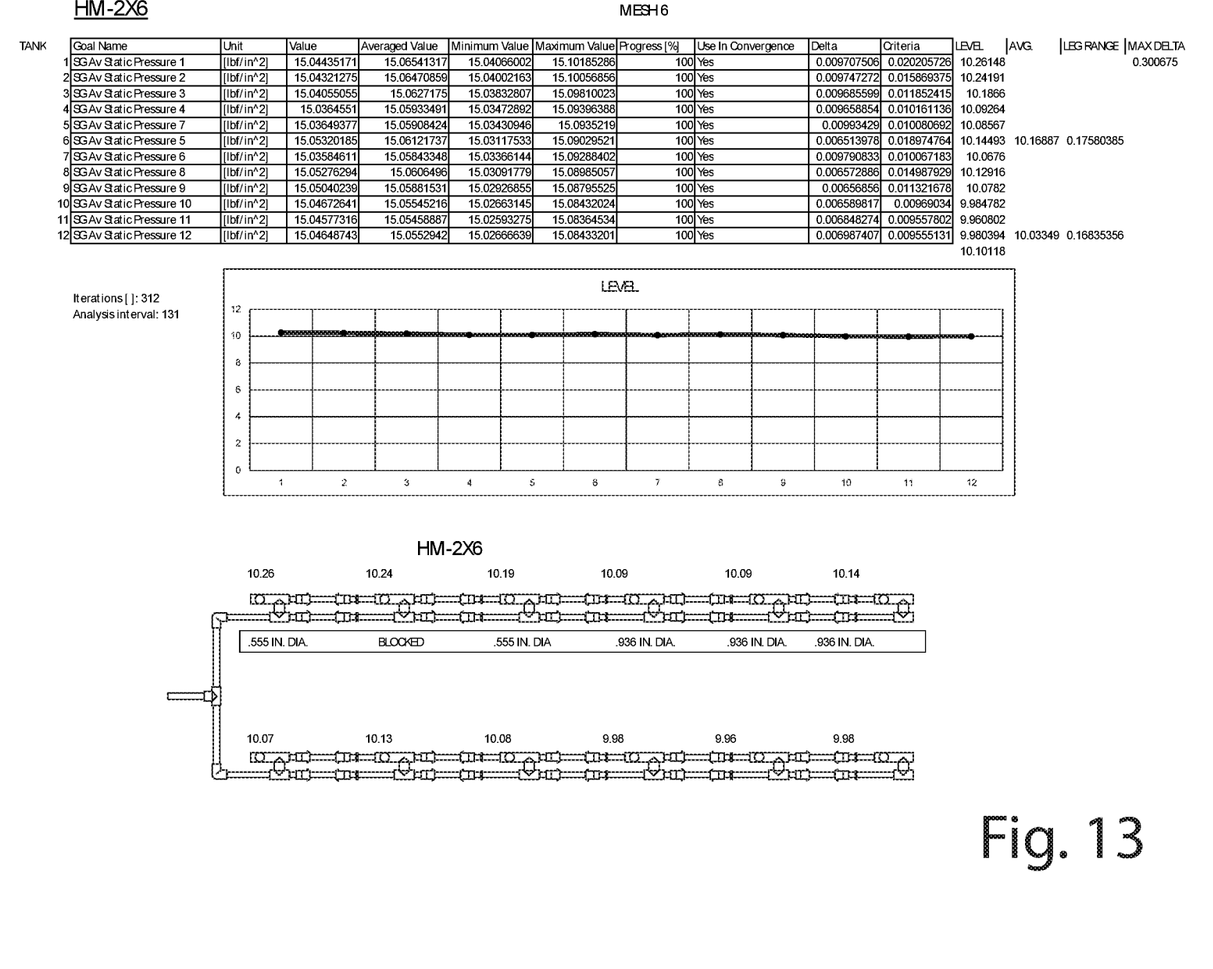

A second embodiment 110 is illustrated in FIGS. 4-6. Elements of the second embodiment that correspond to elements in the first embodiment have designating numbers that are the same plus 100. For example, the tanks 112 in the second embodiment correspond to the tanks 12 in the first embodiment.

The tanks 112 as illustrated are arranged in single row. Multiple rows may be included in the system 110. The tanks 112 are supported by legs 113, which enable the plumbing lines to be routed under the tanks, thereby freeing up floor space between the tanks. Each tank 112 includes a cylindrical boss 115 (see FIG. 5), which enables the tank to be plugged into the tank drain line 22. This connection arrangement enables each tank 112 to be installed and removed relatively easily, for example for service.

Preferably, the plumbing includes a modular design that enables snap-together installation. Each modular section includes a bridge connection 126. However, only those connection bridges 126 required for solution level equalization include flow passages.

IV. Conclusion

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A hydroponic system comprising:
   a plurality of grow tanks arranged in pairs;
   a circulation pump having an inlet and an outlet;
   a nutrient supply line fluidly connected to the outlet of the circulation pump;
   a plurality of tank supply lines each fluidly connecting the nutrient supply line to one of the grow tanks;
   a tank drain line;
   a plurality of tank drain connection lines each fluidly connecting one of the grow tanks to the tank drain line, whereby each of the grow tanks is fluidly connected in parallel between the nutrient supply line and the tank drain line;
   a pump suction line fluidly connected to the inlet of the circulation pump; and
   a plurality of bridge connectors each fluidly connecting the tank drain line to the pump suction line.

2. A hydroponic system as defined in claim 1 wherein the grow tank pairs are arranged into two halves, a first half of grow tank pairs being relatively close to the circulation pump, a second half of the grow tank pairs being relatively remote from the circulation pump, the first half having a first number of bridge connectors, the second half having a second number of bridge connectors.

3. A hydroponic system as defined in claim 2 wherein:
   the number of grow tank pairs within the first and second halves is N;
   the first number is a first function of N; and
   the second number a second function of N.

4. A hydroponic system as defined in claim 3 wherein the first number is:
   one if N is greater than or equal to four; and
   zero if N is less than or equal to three.

5. A hydroponic system as defined in claim 4 wherein the second number is:
   (N/2)+1 if N is even; and
   (N/2)+0.5 if N is odd.

6. A hydroponic system as defined in claim 3 wherein the second number is:
   (N/2)+1 if N is even; and
   (N/2)+0.5 if N is odd.

7. A hydroponic system as defined in claim 1 further comprising:
   a level control tank;
   an additional tank supply hose fluidly connecting the nutrient supply line to the level control tank; and
   an additional tank drain connection line fluidly connecting the level control tank to the tank drain line.

8. A hydroponic system as defined in claim 1 wherein each tank drain is removably connected to the tank drain line.

9. A hydroponic system as defined in claim 1 wherein each tank is supported on legs above the pump suction line, the tank drain line, the nutrient feed line, and the bridge connectors.

10. A hydroponic system as defined in claim 1 wherein each bridge is located on a common side of the fluid connections of the tank drain connection lines to the tank drain line for any adjacent pair of grow tanks.

11. A hydroponic system comprising:
    a plurality of grow tanks;
    a circulation pump having an inlet and an outlet;
    a nutrient supply line fluidly connected to the outlet of the circulation pump;
    a plurality of tank supply lines each fluidly connecting the nutrient supply line to one of the grow tanks;
    a tank drain line;
    a plurality of tank drain connection lines each fluidly connecting one of the grow tanks to the tank drain line, whereby each of the grow tanks is fluidly connected in parallel between the nutrient supply line and the tank drain line;
    a pump suction line fluidly connected to the inlet of the circulation pump; and
    a plurality of bridge connectors each fluidly connecting the tank drain line to the pump suction line.

12. A hydroponic system as defined in claim 11 wherein the grow tanks are arranged into two halves, a first half of grow tanks being relatively close to the circulation pump, a second half of the grow tanks being relatively remote from the circulation pump, the first half having a first number of bridge connectors, the second half having a second number of bridge connectors.

13. A hydroponic system as defined in claim 12 wherein:
    the number of grow tanks within the first and second halves is N;
    the first number is a first function of N; and
    the second number a second function of N.

14. A hydroponic system as defined in claim 13 wherein the first number is:
    one if N is greater than or equal to four; and
    zero if N is less than or equal to three.

15. A hydroponic system as defined in claim 14 wherein the second number is:
    (N/2)+1 if N is even; and
    (N/2)+0.5 if N is odd.

16. A hydroponic system as defined in claim 13 wherein the second number is:
    (N/2)+1 if N is even; and
    (N/2)+0.5 if N is odd.

17. A hydroponic system as defined in claim 11 further comprising:
    a level control tank;
    an additional tank supply line fluidly connecting the nutrient supply line to the level control tank; and
    an additional tank drain connection line fluidly connecting the level control tank to the tank drain line.

18. A hydroponic system as defined in claim 11 wherein each tank drain is removably connected to the tank drain line.

19. A hydroponic system as defined in claim 11 wherein each tank is supported on legs above the pump suction line, the tank drain line, the nutrient feed line, and the bridge connectors.

* * * * *